(12) United States Patent
Chen et al.

(10) Patent No.: US 11,022,864 B2
(45) Date of Patent: Jun. 1, 2021

(54) PROJECTION SYSTEM AND CONTROL METHOD OF DRIVING CURRENT THEREFOR

(71) Applicant: Coretronic Corporation, Hsin-Chu (TW)

(72) Inventors: Shun-Tai Chen, Hsin-Chu (TW); Chung-Lin Ke, Hsin-Chu (TW); Shang-Ko Mao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/683,194

(22) Filed: Nov. 13, 2019

(65) Prior Publication Data

US 2020/0166827 A1    May 28, 2020

(30) Foreign Application Priority Data

Nov. 22, 2018    (CN) .......................... 201811395933.X (51) Int. Cl.
*G03B 21/00* (2006.01)
*G03B 21/32* (2006.01)
(Continued)

(52) U.S. Cl.
CPC ......... *G03B 21/008* (2013.01); *G03B 21/145* (2013.01); *G03B 21/321* (2013.01); *G03B 21/2006* (2013.01)

(58) Field of Classification Search
CPC .... G03B 21/006; G03B 21/008; G03B 21/28; G03B 21/145; G03B 21/206;
(Continued)

(56) References Cited

U.S. PATENT DOCUMENTS

| 2013/0114049 | A1* | 5/2013 | Li | H04N 9/3117 353/84 |
| 2014/0063082 | A1* | 3/2014 | Masuda | G03B 21/142 345/690 |

(Continued)

FOREIGN PATENT DOCUMENTS

| CN | 101185021 | 5/2008 |
| CN | 103676427 | 3/2014 |

(Continued)

OTHER PUBLICATIONS

"Office Action of China Counterpart Application", dated Mar. 2, 2021, p. 1-p. 5.

*Primary Examiner* — Sultan Chowdhury
(74) *Attorney, Agent, or Firm* — JCIPRNET (57) ABSTRACT

A projection system and a control method of a driving current thereof are provided. A power supply of an illumination module provides the driving current to drive a light source to provide an illumination beam. A filter wheel receives the illumination beam and filtered beams are generated. The illumination beam passes through the filter wheel during a first period and a first filtered beam is generated. The illumination beam passes through the filter wheel during a second period and a second filtered beam is generated. The filtered beams include the first filtered beam, the second filtered beam, and an intermediate filtered beam generated during an intermediate period between the first and second periods. A control device controls the power supply to continuously provide the driving current from the first period, through the intermediate period, to the second period.

15 Claims, 5 Drawing Sheets

(51) Int. Cl.
*G03B 21/14* (2006.01)
*G03B 21/20* (2006.01)

(58) Field of Classification Search
CPC ............... G03B 21/208; G03B 21/321; G03B 21/2006; G03B 21/2013; G03B 21/2033; G03B 21/2053; F21V 9/30; F21V 9/32; F21V 9/40; H04N 9/3105; H04N 9/3111; H04N 9/3117; H04N 9/3141; H04N 9/3155; H04N 9/3158; H04N 9/3164; H04N 9/3182
See application file for complete search history.

(56) References Cited

U.S. PATENT DOCUMENTS

| | | | | |
|---|---|---|---|---|
| 2014/0077714 | A1* | 3/2014 | Suzuki | H05B 47/16 |
| | | | | 315/200 R |
| 2018/0039168 | A1* | 2/2018 | Suzuki | G03B 21/2066 |
| 2018/0136552 | A1* | 5/2018 | Kobayashi | G03B 21/204 |
| 2019/0098265 | A1* | 3/2019 | Takahama | H04N 9/3114 |

FOREIGN PATENT DOCUMENTS

| | | |
|---|---|---|
| CN | 103728824 | 4/2014 |
| CN | 104914656 | 9/2015 |
| CN | 102819175 | 11/2015 |
| CN | 108255001 | 7/2018 |
| CN | 209028402 | 6/2019 |

* cited by examiner

PROJECTION SYSTEM AND CONTROL METHOD OF DRIVING CURRENT THEREFOR

CROSS-REFERENCE TO RELATED APPLICATION

This application claims the priority benefit of China application serial no. 201811395933.X, filed on Nov. 22, 2018. The entirety of the above-mentioned patent application is hereby incorporated by reference herein and made a part of this specification.

BACKGROUND OF THE INVENTION

Field of the Invention

The invention relates to a projection technology, and more particularly to a projection system and a control method of a driving current therefor.

Description of Related Art

Laser may be used as a light source in a general projection system and a phosphor wheel may be adopted to generate beams of other colors. For example, a phosphor wheel with green phosphor powders or yellow phosphor powders thereon may be used to generate a green beam or a yellow beam when excited by a blue laser beam. However, color beams generated from the phosphor wheel may range in a relatively wide light spectrum or they may have an undesirable color. Therefore a filter wheel is needed in a projection system, so as to provide primary color beams as required.

The phosphor wheel and the filter wheel are often rotatable and may have different color regions. When a light beam illuminates on to a junction of two regions, a mixture color beam may be produced undesirably. For instance, the junction of the two regions may be called a spoke region. In the existing projection system, when it comes to the spoke region, the light source may be optionally shut down, so as to avoid an output of a mixture color beam. In such way, along with a significant sacrifice of brightness, a noise may also be made during the use of the projection system caused from drastic changes of the driving current when the light source is turned on or off. Therefore, a user may not have a better experience when using the existing projection system.

The information disclosed in this Background section is only for enhancement the understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides a projection system and a control method of a driving current, and a noise generated during the process of projection when the light source is turned on or off may be prevented or reduced substantially.

The objectives and advantages can be further illustrated by the technical features broadly embodied and described as follows.

To achieve one or a part or all the objectives or other objectives, an embodiment of the invention provides a projection system. The projection system includes an illumination module, a filter wheel, a control device, a light valve, and a projection lens. The illumination module is configured to provide an illumination beam, and the illumination module includes a power supply providing a driving current and a light source. The light source is driven by the driving current to provide an illumination beam. The filter wheel is disposed on a transmission path of the illumination beam and configured to receive the illumination beam and provide a plurality of filtered beams. The illumination beam passes through the filter wheel during a first period and a first filtered beam is generated, the illumination beam passes through the filter wheel during a second period and a second filtered beam is generated. The filtered beams include the first filtered beam and the second filtered beam. The filtered beams further include an intermediate filtered beam generated from the illumination beam passing through the filter wheel during an intermediate period between the first period and the second period. The control device is configured to control the power supply, so that the power supply continuously provides the driving current from the first period, through the intermediate period, to the second period, so as to drive the light source. The light valve is disposed on the transmission paths of the filtered beams, so as to convert the filtered beams into an image beam. The projection lens is utilized to project an image beam.

To achieve one or a part or all the objectives or other objectives, an embodiment of the invention provides a control method of a driving current for a projection system. The projection system includes an illumination module and a control device. The illumination module includes a power supply and a light source, and the power supply can be controlled by the control device to provide the driving current for the light source. The control method includes: during a first period, providing a first driving current; during an intermediate period after the first period, providing an intermediate driving current; and during a second period after the intermediate period, providing a second driving current. The driving current is continuously provided during the first period, the intermediate period, and the second period.

In light of the above, the embodiments provided in the invention at least demonstrate one of the advantages or effects below. In the projection system and the control method of the driving current for the projection system provided herein, the power supply for the laser do not need to be turned off during the process of projection. Instead of turning off the power supply, a noise may be prevented or avoided by adjusting the value of the driving current such that drastic changes of the driving current are minimized or eliminated when it comes to the spoke region.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
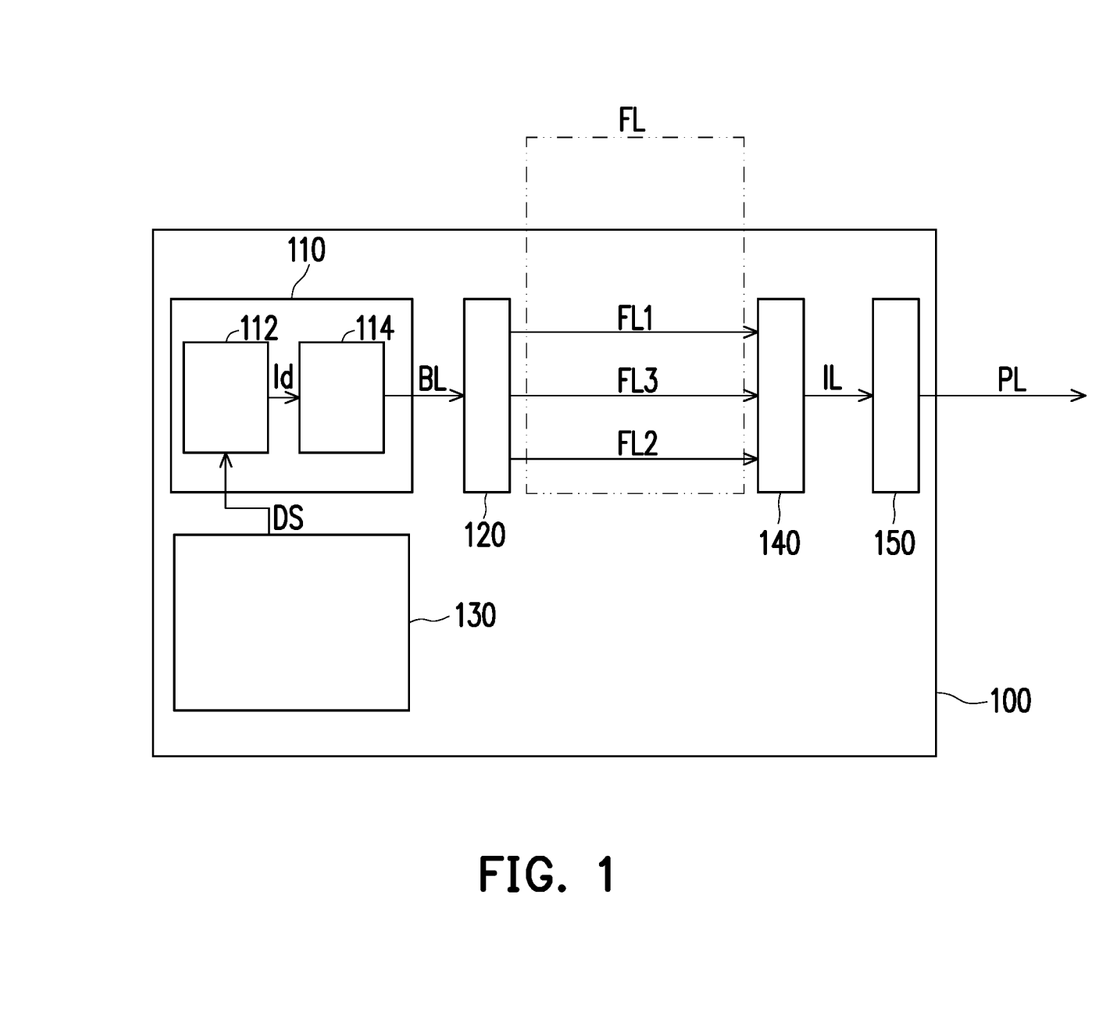
FIG. 1 is a schematic view of a projection system according to an embodiment of the invention.

FIG. 1 is a schematic view of a projection system according to an embodiment of the invention. The projection system 100 includes an illumination module 110, a filter wheel 120, a control device 130, a light valve 140, and a projection lens 150. The illumination system 110 is configured to provide an illumination beam BL. The illumination module 110 includes a power supply 112 and a light source 114. The power supply 112 provides a driving current Id, and the light source 114 is driven by a driving current Id to provide the illumination beam BL. The filter wheel 120 is disposed on a transmission path of the illumination beam BL and configured to receive the illumination beam BL and provide a plurality of filtered beams FL. The filtered beams FL include a first filtered beam FL1 generated during a first period, a second filtered beam FL2 generated during a second period, and an intermediate filtered beam FL3 generated during an intermediate period. The intermediate period is between the first period and the second period, and the intermediate period is, for instance, a spoke period.

The control device 130 is configured to control the power supply 112, so that the power supply 112 continuously provides the driving current Id from the first period, through the intermediate period, to the second period, so as to drive the light source 114. The light valve 140 is disposed on transmission paths of the filtered beams FL and configured to convert the filtered beams FL into an image beam IL. The projection lens 150 is disposed on a transmission path of the image beam IL, so as to project the image beam IL. The image beam IL can be projected onto the screen or the wall to display a projection image.

Figure 2:
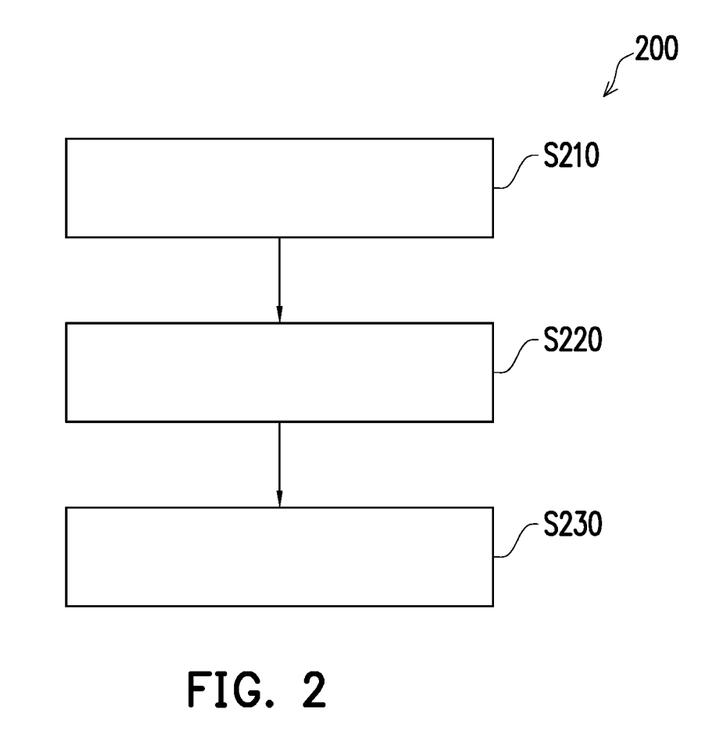
FIG. 2 is a flowchart of a control method of a driving current for a projection system according to an embodiment of the invention.

FIG. 2 is a flowchart of a control method of a driving current for a projection system according to an embodiment of the invention. With reference to FIG. 1 and FIG. 2, the control method 200 depicted in FIG. 2 can be applied to the projection system 100 depicted in FIG. 1. Steps of the control method 200 are explained hereinafter with reference to elements or devices in the projection system 100.

In step S210, during the first period, the control device 130 controls the power supply 112 to provide a first driving current for the light source 114, such that the illumination beam BL passes through the filter wheel 120 and a first filtered beam FL1 is generated. In step S220, during the intermediate period, the control device 130 controls the power supply 112 to provide an intermediate driving current for the light source 114, such that the illumination beam BL passes through the filter wheel 120 and an intermediate filtered beam FL3 is generated. In step S230, the control device 130 controls the power supply 112 to provide a second driving current for the light source 114, such that the illumination beam BL passes through the filter wheel 120 and a second filtered beam FL2 is generated. From the first time period, through the intermediate time period, to the second time period, the power supply 112 can continuously provide the driving current Id for the light source 114, so that the light source 114 may be driven to emit beams during all these periods.

Other relevant implementation details may be elaborated hereinafter.

Specifically, the power supply 112 can be connected to a driving current generation circuit, for instance. The control device 130 provides a driving signal DS, and the driving current generation circuit provides the driving current Id based on an external voltage converted from the driving signal DS. Alternatively, the power supply 112 may inherently include a voltage source, e.g., a battery. For instance, the driving current generation circuit may be connected to and powered by the battery, so that the driving current Id provided may be adjusted according to the driving signal DS. The light source 114 is, for instance, a diode module constituted by a light emitting diode (LED) chip or a laser diode (LD) chip and the light source 114 can provide a monochromatic beam, e.g., a blue beam or a red beam, but the invention is not limited thereto.

In an embodiment, the illumination module 110 can further include a wavelength conversion device, a beam splitter (not shown), and so on, but the invention is not limited thereto. The wavelength conversion device is an optical device configured to convert a beam of a relatively short wavelength into a beam of a relatively long wavelength. The beam splitter is an optical device capable of splitting beams. The illumination beam BL may include a beam emitted from the light source 112, a beam converted from the wavelength conversion device, a beam split from the beam splitter, and/or any other reflected or refracted beam.

For instance, the wavelength conversion device may be a phosphor wheel on which at least one wavelength conversion region and a penetration region can be arranged. The wavelength conversion region has an electroluminescent material thereon (e.g., phosphor powder) that can receive the beam of a short wavelength and generate a corresponding converted beam due to electroluminescent effects. The penetration region allows an incident beam to pass through. Alternatively or additionally, the phosphor wheel may include a reflection region that can reflect an incident beam. The beam splitter can select the beams to be split based on different wavelengths (different colors) and may be a dichroic mirror (DM). However, the invention is not limited thereto.

In the embodiment, for instance, the light source 112 can provide a blue laser beam, and the blue laser beam is converted by the wavelength conversion device into a yellow beam, for instance. The yellow beam is split into a red beam and a green beam by the beam splitter. Alternatively, the blue laser beam is directly converted into the red beam and the green beam by the wavelength conversion device. The illumination beam BL includes these beams of different colors.

In the embodiment or in other embodiments, the filter wheel 120 may be a color filter wheel. The filter wheel 120 has at least one filter region configured to allow beams of different colors to pass through and generate various filtered beams. In the embodiment, the illumination beam BL passing through the filter wheel 120 becomes various filtered beams of different colors. The color and number of the filtered beams are not limited in the invention.

The light valve 140 may include one or more selected from digital micro-mirror devices (DMD), liquid crystal on silicon (LCoS) panels, liquid crystal panels, and other spatial light modulators. Detailed steps and implementations of the conversion process from the monochromatic beam received by the light valve 140 to the image beam may be already known to those ordinarily skilled in the art and thus may not be further explained.

The projection lens 150 includes one optical lens or a combination of optical lenses of various diopters. For example, the projection lens 150 may include various combinations of the following non-planar lenses: a biconcave lens, a biconvex lens, a concave-convex lens, a convex-concave lens, a plano-convex lens, and a plano-concave lens. In an embodiment, the projection lens 150 may also include a planar optical lens. The configuration and the type of the projection lens 150 are not limited herein.

Figure 3:
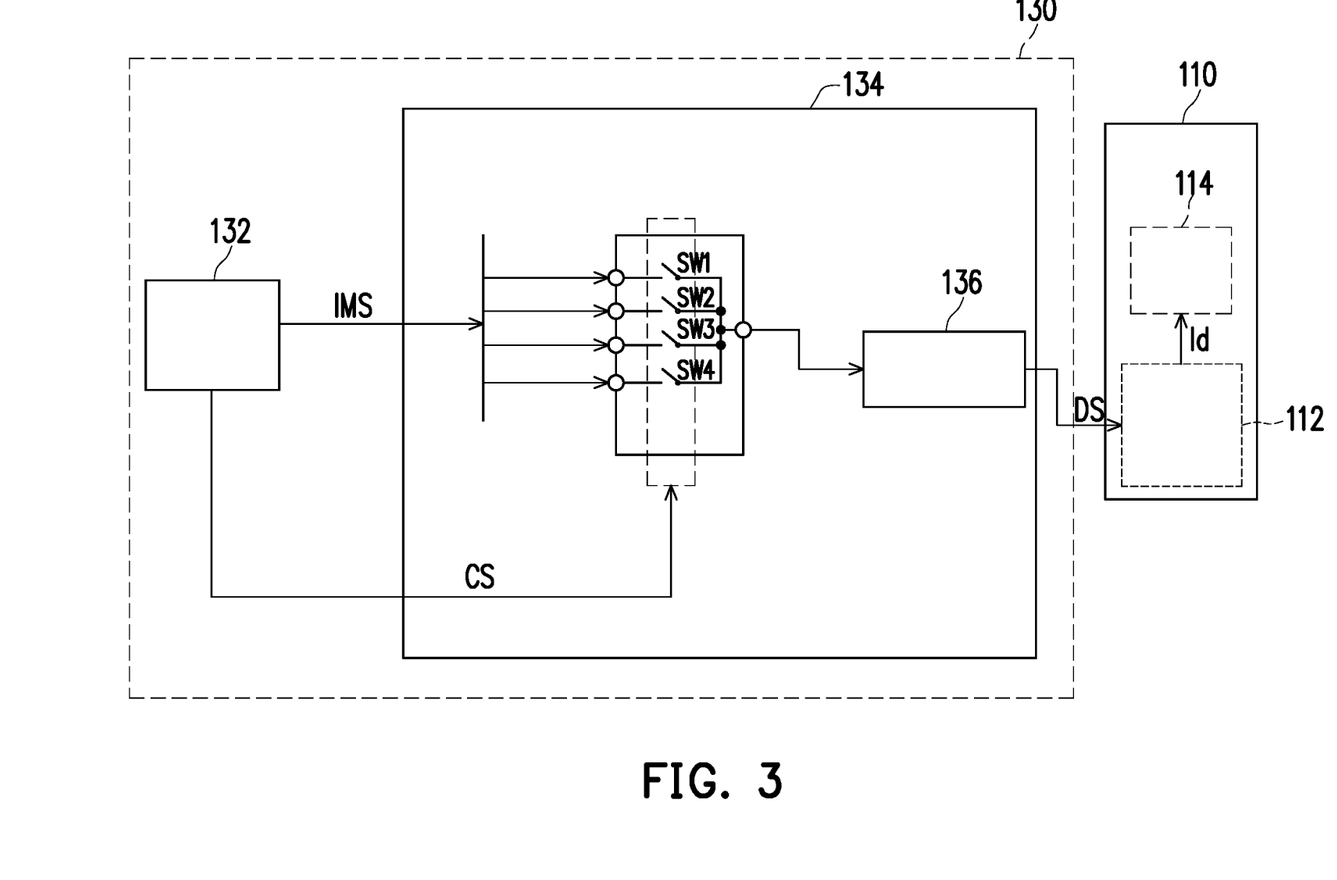
FIG. 3 is a schematic block view of a control device according to an embodiment of the invention.

FIG. 3 is a schematic block view of a control device according to an embodiment of the invention. For instance, the control device 130 includes a processor 132 and a current control circuit 134, and the current control circuit 134 includes a plurality of switches and a driver 136. The switches herein may include four switches SW1-SW4, for instance, and the four switches SW1-SW4 may not be construed as a limitation to the invention. The processor 132 may be electrically connected or communicatively connected to the current control circuit 134. The processor 132 may provide a control signal CS and a current modulating signal IMS to the current control circuit 134. The current control circuit 134 may selectively switch on or off the switches SW1-SW4 according to the control signal CS, and/or the current control circuit 134 may adjust the value of the driving current Id according to the current modulating signal IMS.

Specifically, the switches SW1-SW4 respectively correspond to a red region, a green region, a blue region, and a spoke region. One terminal of any of the switches SW1-SW4 may be electrically connected or communicatively connected to the processor 132, so that the switch may be switched on or off according to the control signal CS provided by the processor 132. The other terminal of any of the switches SW1-SW4 may be electrically connected to the driver 136. For instance, the switches SW1-SW4 may be connected or disconnected according to the control signal CS. For instance, if the switch SW1 is connected, the switch SW1 is in a conductive state (being switched on). If the switch SW1 is disconnected, the switch SW1 is in a non-conductive state (being switched on). The driver 136 is electrically connected to the switches SW1-SW4 and is electrically connected to the processor 132 through at least one of the switches SW1-SW4.

In the embodiment, when one of the switches SW1-SW4 is switched on, the other switches are switched off. For instance, when the filter wheel 120 comes to a blue period, the switch SW3 is connected, and the switches SW1, SW2, and SW4 are disconnected. As to the blue region, the current modulating signal IMS provided by the processor 132 is transmitted to the driver 136, so that the light source 114 may be driven by the power supply 112 to emit the blue laser with a proper intensity. In the embodiment or in other embodiments, when the filter wheel 120 comes to the spoke period, the switch SW4 is connected, and the switches SW1-SW3 are disconnected. As to the spoke region, the current modulating signal IMS corresponding to the intermediate driving current is transmitted to the driver 136, and the driver 136 provides the driving signal DS according to the electric current value information associated with the current modulating signal IMS. In such way, the value of the driving current provided by the power supply 112 may be controlled and adjusted.

For instance, by switching on or off one of the switches SW1-SW4 according to the control signal CS, the driving current Id provided by the power supply 112 may be modulated by the driver 136 according to a duty ratio of the current modulating signal IMS.

Figure 4A:
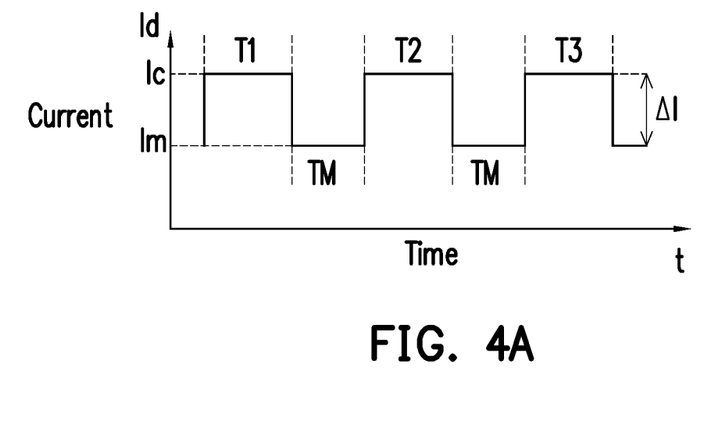
FIGS. 4A and 4B are schematic views of a driving current according to an embodiment of the invention.
Figure 4B:
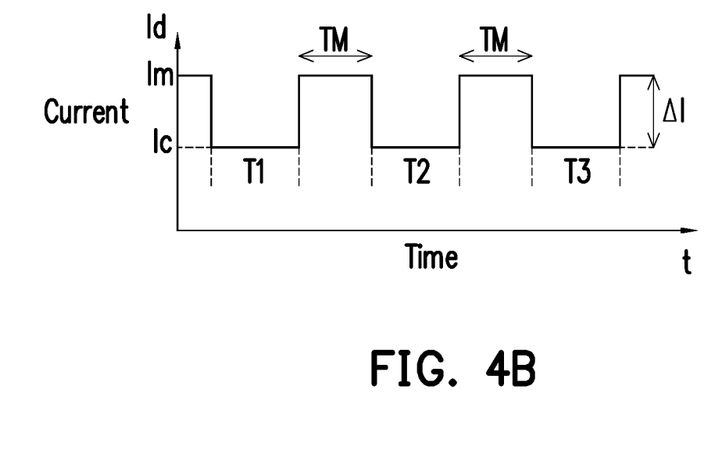

FIGS. 4A and 4B are schematic views of a driving current according to an embodiment of the invention. The driving current Id depicted in FIGS. 4A and 4B may be generated by using the system or the method provided in the embodiments as shown in FIG. 1 to FIG. 3. For instance, the value of the driving current Id during a period T1, a period T2, and a period T3 may be same, i.e., a driving current Ic. The value of the driving current Id in each intermediate period TM may also remain the same, i.e., a driving current Im. The above descriptions are exemplary, and the various driving currents Id during these periods may be the same or different.

In the embodiments shown in FIG. 4A and FIG. 4B, for instance, the filter wheel 120 has a first filter region, a second filter region, and a third filter region arranged adjacently to each other. The illumination beam BL illuminates onto the first filter region, the second filter region, and the third filter region in turn during the period T1, the period T2, and the period T3, so as to respectively provide the first filtered beam, the second filtered beam, and a third filtered beam. The first filtered beam, the second filtered beam, and the third filtered beam are, for instance, the red beam, the green beam, and the blue beam, but the invention is not limited thereto.

In an embodiment, when the beam emitted from the light source 112 is a blue laser beam, and during the period T3, the blue laser of the illumination beam BL illuminates onto the filter wheel 120, the third filter region may be replaced by a penetration region, and the blue laser beam serves as the third filtered beam herein after passing through the penetration region. The structure and the configuration of the filter wheel 120 are not limited in the invention.

In the embodiment, during the intermediate period TM between the period T1 and the period T2, an illumination region of the illumination beam BL is being moved from the first filter region to the second filter region, and an intermediate filtered beam may be generated. In the embodiment, in the intermediate period TM between the period T2 and the period T3, the illumination region of the illumination beam BL is being moved from the second filter region to the third filter region, and another intermediate filtered beam may be generated. Likewise, between the period T3 and a period following the period T3, there may be one more intermediate period TM during which still another intermediate filtered beam may be generated. In such way, different beams are generated cyclically according to the configuration of the filter wheel.

As for a transition from the period T1 to the period T2, the period T1, the period T2, and the intermediate period TM between the period T1 and the period T2 may be respectively referred as the first period, the second period, and the intermediate period. The first period T1, the intermediate period TM, and the second period T2 may be successive, and a length of the intermediate period TM is smaller than a length of the first period T1 and smaller than a length of the second period T2. The first filtered beam, the second filtered beam, and the intermediate filtered beam may correspond to the first filtered beam FL1, the second filtered beam FL2, and the intermediate filtered beam FL3 depicted in FIG. 1.

During the first period T1, the switch SW1 is connected, the switches SW2-SW4 are disconnected, the power supply 112 provides the first driving current (with the value Ic), and the illumination beam BL passes through the first filter region of the filter wheel 120 to provide the first filtered beam FL1 (e.g., a red beam). During the second period T2, the switch SW2 is connected, the switches SW1, SW3, and SW4 are disconnected, the power supply 112 provides the second driving current (e.g., with the same value Ic), and the illumination beam BL passes through the second filter region of the filter wheel 120 to provide the second filtered beam FL2 (e.g., a green beam).

During the intermediate period TM between the first period T1 and the second period T2, the switch SW4 is connected, the switches SW1-SW3 are disconnected, the power supply 112 provides the intermediate driving current (e.g., with the value Im), the illumination beam BL simultaneously illuminates a portion of the first filter region and a portion of the second filter region, and the intermediate filtered beam is generated. Hence, the intermediate filtered beam may be a mixture beam of the first filtered beam and the second filtered beam. During the intermediate period TM, the light valve 140 may be turned off.

In order to prevent or reduce the noise caused from drastic changes of the driving current Id, the difference between the first driving current and the intermediate driving current may be smaller than or equal to half of the larger one of the first driving current and the intermediate driving current. Particularly, the value of the intermediate driving current may be within a range from one-half of the first driving current to twice the first driving current. Namely, $Ic/2 \leq Im \leq 2Ic$. Besides, in order to further prevent or reduce the noise, the second driving current may also be within a range from one-half of the intermediate driving current to twice the intermediate driving current. Namely, $Im/2 \leq Ic \leq 2Im$.

In other words, the absolute value of the difference $\Delta I$ between the intermediate driving current and the first driving current is smaller than or equal to one-half of the larger one of the intermediate driving current and the first driving current. Alternatively or additionally, the absolute value of the difference $\Delta I$ between the second driving current and the intermediate driving current and is smaller than or equal to one-half of the larger one of the intermediate driving current and the second driving current.

During the intermediate period TM, the light valve 140 may be turned off. To be specific, to reduce the power consumption and/or reduce additional heat energy of the projection system 100, within said value range of the intermediate driving current, a relatively small value can be selected for the intermediate driving current. For example, the value of the intermediate driving current may be reduced. Hence, the intermediate driving current may be larger than or equal to one-half of the first driving current and smaller than or equal to the first driving current, that is, the value of the intermediate driving current may meet $Ic/2 \leq Im \leq Ic$. Besides, in order to improve power efficiency and/or image brightness, within said value range of the second driving current, a relatively large value may be selected for the second driving current. For example, the value of the second driving current may be larger than or equal to the intermediate driving current and smaller than or equal to twice the intermediate driving current, namely, the value of the second driving current may meet $Im \leq Ic \leq 2Im$.

In the embodiment shown in FIG. 4A, the value Im of the intermediate driving current is smaller than the value Ic of the first driving current and the value Ic of the second driving current, and the value Im of the intermediate driving current is larger than one-half of the value Ic. In the embodiment shown in FIG. 4B, the value Im of the intermediate driving current is larger than the value Ic of the first driving current and the value Ic of the second driving current, and the value Im of the intermediate driving current is smaller than twice the value Ic.

During the period T3, the value of the driving current Id is also Ic. Hence, during the transition from the period T2 to the period T3, the way of adjusting the driving current during the intermediate period TM may be similar to those described above and thus will not be further explained.

Generally, In order to prevent or reduce the noise caused during the projection process from the first period T1 to the second period T2, the control device 130 may control the power supply 112 to continuously provide the driving current Id, that is, during the projection process, the light source 114 may not be turned off. During the intermediate period TM, the control device 130 can control the power supply 112, so that the value of the driving current Id may be adjusted. In further view of energy save, the intermediate driving current may be controlled by the control device 130 to be larger than or equal to one-half of the larger one of the first driving current and the second driving current, and smaller than or equal to twice the smaller one of the first driving current and the second driving current.

Figure 5:
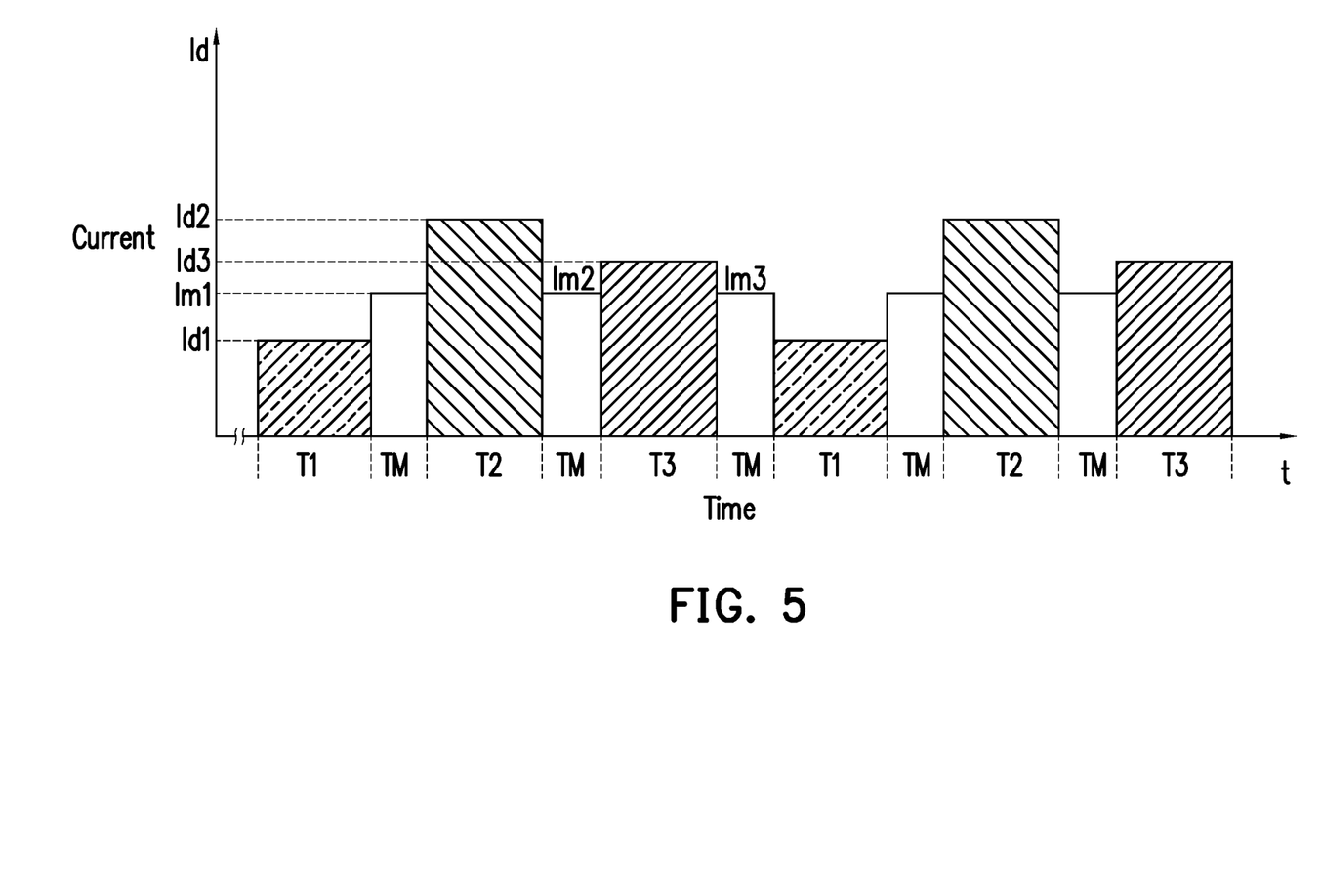
FIG. 5 is a schematic view of a driving current according to another embodiment of the invention.

FIG. 5 is a schematic view of a driving current according to another embodiment of the invention. The embodiment depicted in FIG. 5 is similar to the embodiments illustrated in FIG. 4A and FIG. 4B, and can be implemented by the projection system 100 and the control method 200. As shown in FIG. 5, during the first period T1, the second period T2, and the third period T3, the value of the driving current may change, and the value of the driving current in each intermediate period TM between these periods T1-T3 may also be different.

For instance, during the first period T1, the driving current is the first driving current Id1, during the second period T2, the driving current is the second driving current Id2, and during the third period T3, the driving current is the third driving current Id3. The first driving current Id1 is smaller than the second driving current Id2, the second driving current Id2 is larger than the third driving current Id3, and the third driving current Id3 is larger than the first driving current Id1 following by sequence. The driving current during the intermediate period TM between the first period T1 and the second period T2, between the second period T2 and the third period T3, and between the third period T3 and the first period T1 may be the intermediate driving current Im1, the intermediate driving current Im2, and the intermediate driving current Im3, respectively.

As to the intermediate period TM between the period T1 and the period T2, in order to prevent or reduce the noise caused during the change from Id1 to Im1 of the value of the driving current, the intermediate driving current Im1 may be set larger than or equal to one-half of the first driving current Id1 and smaller than or equal to twice the first driving current Id1. Further, in order to reduce power consumption, the intermediate driving current Im1 may be set larger than or equal to one-half of the first driving current Id1 and smaller than or equal to the first driving current Id1.

Similarly, in order to prevent or reduce the noise caused during the change from Im1 to Id2 of the value of the driving current, the second driving current Id2 may be set larger than or equal to one-half of the intermediate driving current Im1 and smaller than or equal to twice the intermediate driving current Im1. That is, the difference ΔI of the driving current between two adjacent periods is smaller than or equal to one-half of the larger one of the driving currents during the two adjacent periods.

Specifically, in the embodiment, in order to prevent or reduce the noise and reduce power consumption during the intermediate period TM, the intermediate driving current Im1 can be set larger than or equal to one-half of the larger one of the first driving current Id1 and the second driving current Id2 and be set smaller than or equal to twice the smaller one of the first driving current Id1 and the second driving current Id2.

Similarly, as to the intermediate period TM between the period T2 and the period T3, the intermediate driving current Im2 may be set larger than or equal to one-half of the second driving current Id2 and be set smaller than or equal to twice the third driving current Id3. As to the intermediate period TM between the period T3 and the period T1, the intermediate driving current Im3 may be set larger than or equal to one-half of the third driving current Id3 and be set smaller than or equal to twice the first driving current Id1. The aforesaid ranges for the intermediate driving currents Im1, Im2, and Im3 can be set the same or different, and the invention is not limited thereto.

To sum up, one or more embodiments provided herein have at least one of the following advantages or achieve at least one of the following effects. In the projection system and the control method of the driving current for the projection system provided herein, the projection system may, according to the image to be projected, obtain a plurality of driving currents corresponding to various filter regions on the filter through which the illumination beam is passing. The intermediate driving current is adjusted base on the driving currents, so that the variation of the driving currents does not exceed one-half of the larger one of the driving currents of the two adjacent periods, so as to prevent or reduce the noise caused due to the turning on or off of the light source during the projection. The driving currents corresponding to the various filter regions of the filter wheel may be predetermined based on requirements of luminance, image contrast, color brightness, and so on. In this case, the intermediate driving currents Im1, Im2, and Im3 may partially or selectively comply with the above-mentioned value ranges based on the values of the first, second, and/or third driving currents, so that the requirement of brightness of the output images and/or the requirement of noise reduction are satisfied. During the intermediate period, the power supply of the projection system may not need to be turned off, and the light valve may be turned off during the intermediate period, so that the intermediate filtered beams may not be projected and a good image quality may be ensured.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A projection system comprising: an illumination module, a filter wheel, a control device, a light valve, and a projection lens, wherein the illumination module is configured to provide an illumination beam, and the illumination module comprises a power supply and a light source, wherein the power supply provides a driving current, and the light source is driven by the driving current and provides the illumination beam, wherein the filter wheel is disposed on a transmission path of the illumination beam, configured to receive the illumination beam and provide a plurality of filtered beams, wherein the illumination beam passes through the filter wheel during a first period and a first filtered beam is generated, the illumination beam passes through the filter wheel during a second period and a second filtered beam is generated, and the plurality of filtered beams comprise the first filtered beam and the second filtered beam, and wherein the plurality of filtered beams further comprise an intermediate filtered beam generated from the illumination beam passing through the filter wheel during an intermediate period between the first period and the second period, wherein the control device is configured to control the power supply, so that the power supply continuously provides the driving current from the first period, through the intermediate period, to the second period, so as to drive the light source, wherein the light valve is disposed on transmission paths of the plurality of filtered beams and configured to convert the plurality of filtered beams into an image beam, wherein the projection lens is disposed on a transmission path of the image beam and configured to project the image beam, wherein during the first period, the second period, and the intermediate period, the driving current is a first driving current, a second driving current, and an intermediate driving current, respectively; and wherein an absolute value of a difference between the intermediate driving current and the first driving current is smaller than or equal to one-half of the larger one selected from the intermediate driving current and the first driving current.

2. The projection system according to claim 1, wherein the intermediate driving current is larger than or equal to one-half of the first driving current and is smaller than or equal to twice the first driving current.

3. The projection system according to claim 2, wherein the intermediate driving current is larger than or equal to one-half of the first driving current and is smaller than or equal to the first driving current.

4. The projection system according to claim 1, wherein the second driving current is larger than or equal to one-half of the intermediate driving current and is smaller than or equal to twice the intermediate driving current.

5. The projection system according to claim 4, wherein the second driving current is larger than or equal to the intermediate driving current and is smaller than or equal to twice the intermediate driving current.

6. The projection system according to claim 1, wherein the intermediate driving current is larger than or equal to one-half of the larger one selected from the first driving current and the second current and the intermediate driving current is smaller than or equal to twice the smaller one selected from the first driving current and the second driving current.

7. The projection system according to claim 1, wherein the intermediate filtered beam is a mixture beam of the first filtered beam and the second filtered beam.

8. The projection system according to claim 1, wherein the control device comprises a processor and a current control circuit, wherein
the processor is configured to provide a control signal and a current modulating signal,
the current control circuit controls a value of the driving current according to the control signal and the current modulating signal, and the current control circuit comprises a plurality of switches and a driver, and wherein
the plurality of switches are electrically connected to the processor, and the plurality of switches are switched on or off according to the control signal,
the driver is electrically connected to the processor and the plurality of switches, and by switching on one of the plurality of switches according to the control signal, the driving current provided by the power supply is modulated by the driver according to a duty ratio of the current modulating signal.

9. The projection system according to claim 1, wherein the light valve is turned off during the intermediate period.

10. The projection system according to claim 1, wherein the first period, the intermediate period, and the second period are successive, and a length of the intermediate period is smaller than a length of the first period and smaller than a length of the second period.

11. A control method of a driving current for a projection system, wherein the projection system includes an illumination module and a control device, the illumination module comprises a power supply and a light source, the power supply is controlled by the control device to provide a driving current for the light source, and the control method comprises:
during a first period, providing a first driving current as the driving current;
during an intermediate period after the first period, providing an intermediate driving current as the driving current; and
during a second period after the intermediate period, providing a second driving current as the driving current, wherein the power supply continuously provides the driving current from the first period, through the intermediate period, to the second period,
wherein an absolute value of a difference between the intermediate driving current and the first driving current is smaller than or equal to one-half of the larger one selected from the intermediate driving current and the first driving current.

12. The control method of the driving current according to claim 11, wherein the projection system further comprises a light valve, and the light valve is turned off during the intermediate period.

13. The control method of the driving current according to claim 11, wherein the absolute value of a difference between the intermediate driving current and the second driving current is smaller than or equal to one-half of the larger one selected from the intermediate driving current and the second driving current.

14. The control method of the driving current according to claim 11, wherein the first period, the intermediate period, and the second period are successive, and a length of the intermediate period is smaller than a length of the first period and smaller than a length of the second period.

15. A control method of a driving current for a projection system, wherein the projection system includes an illumination module and a control device, the illumination module comprises a power supply and a light source, the power supply is controlled by the control device to provide a driving current for the light source, and the control method comprises:

during a first period, providing a first driving current as the driving current;

during an intermediate period after the first period, providing an intermediate driving current as the driving current; and during a second period after the intermediate period, providing a second driving current as the driving current, wherein the power supply continuously provides the driving current from the first period, through the intermediate period, to the second period, wherein the first period, the intermediate period, and the second period are successive, and a length of the intermediate period is smaller than a length of the first period and smaller than a length of the second period.

* * * * *